Dec. 4, 1945. C. A. ARENS 2,390,069
CONTROL MECHANISM
Filed Feb. 23, 1942 3 Sheets-Sheet 3
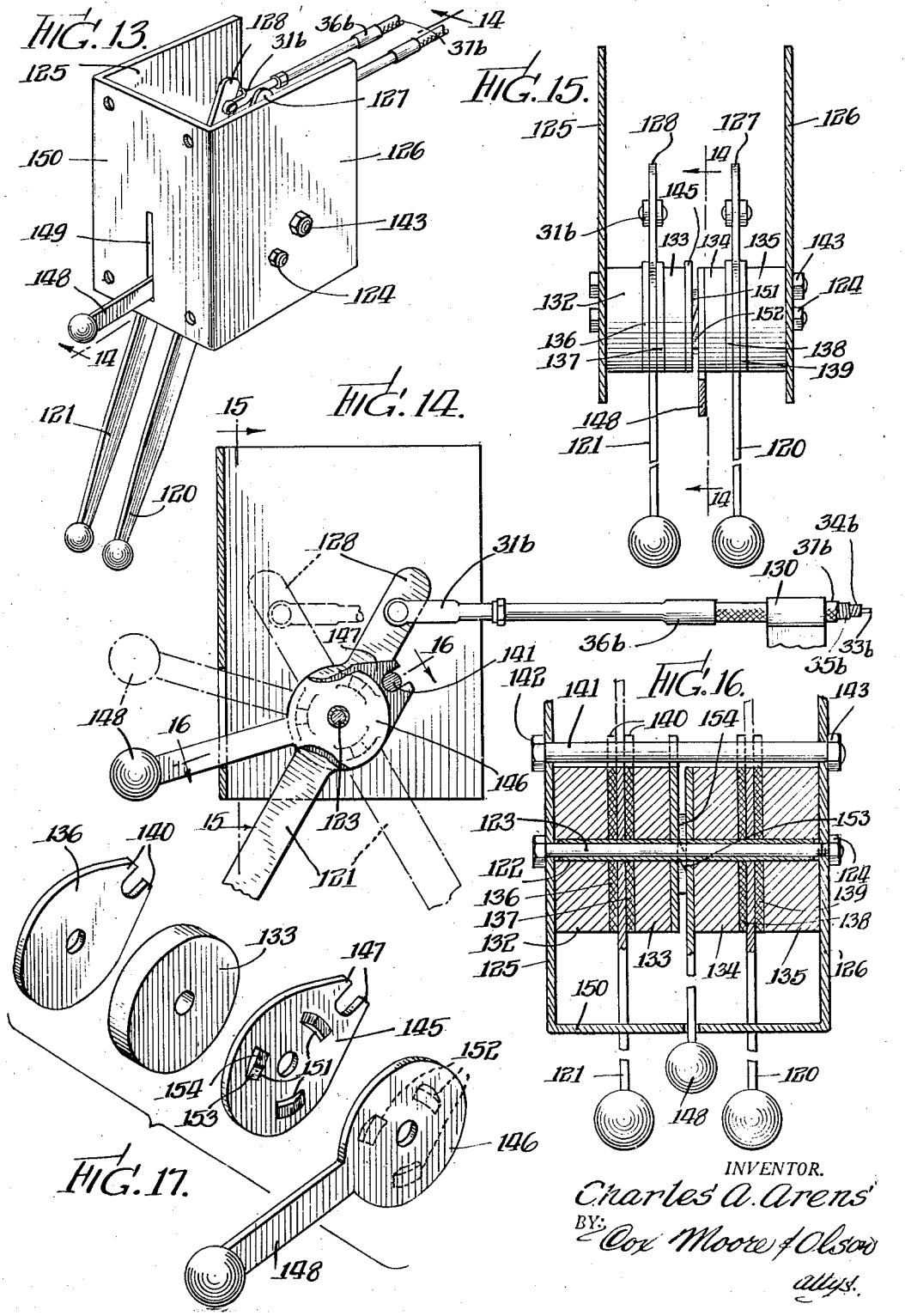
INVENTOR.
Charles A. Arens
BY Cox Moore & Olson
attys.

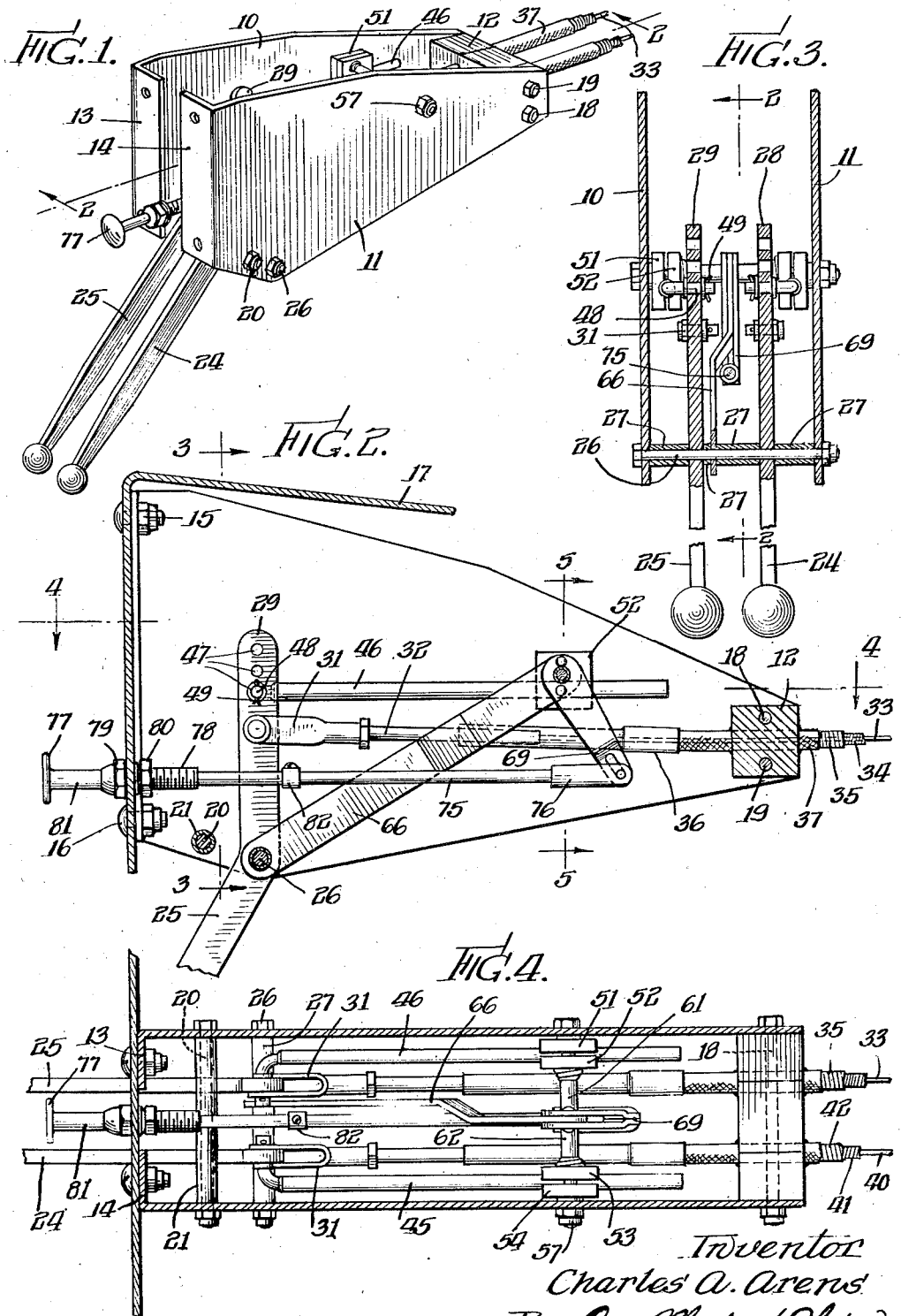

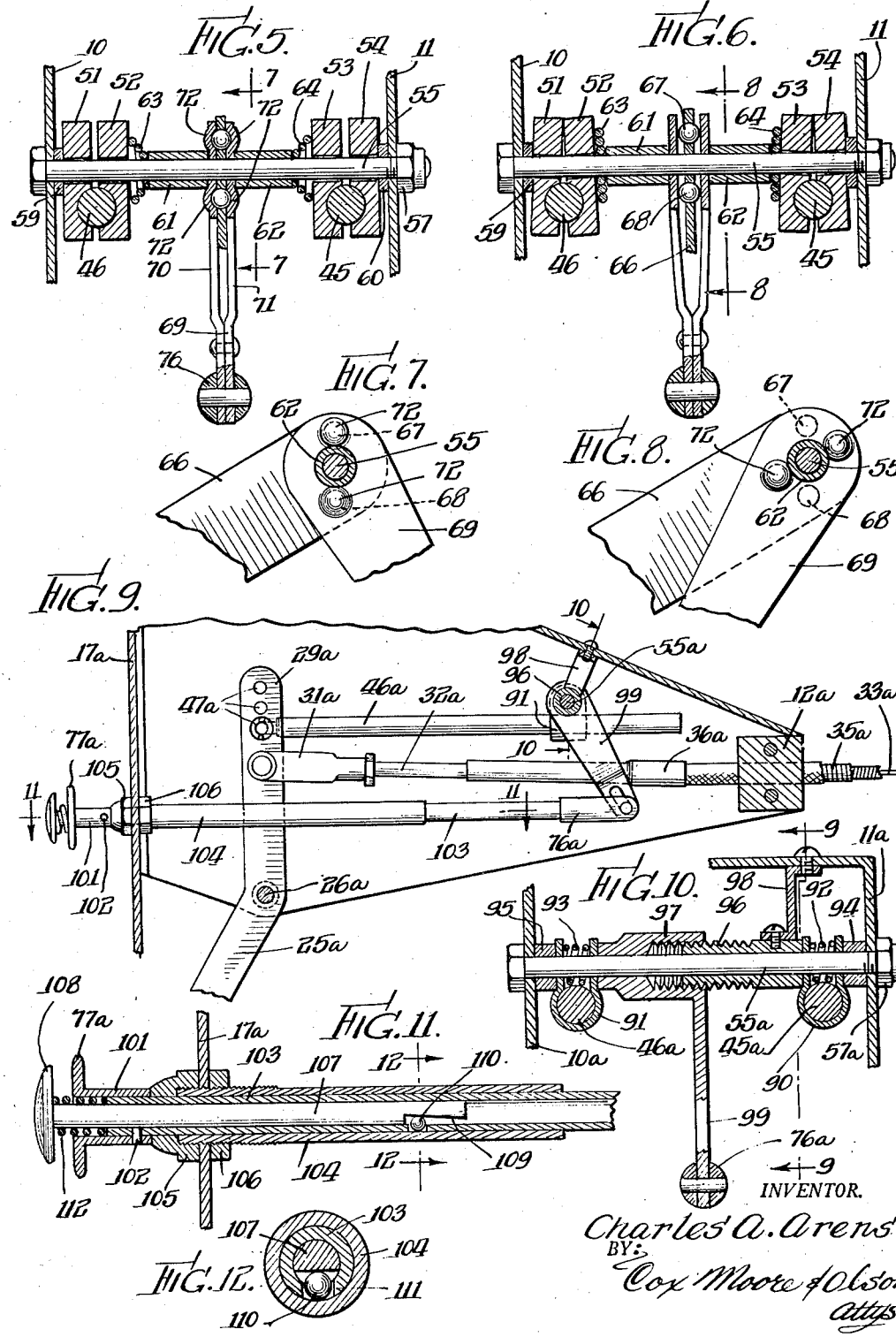

Patented Dec. 4, 1945

2,390,069

UNITED STATES PATENT OFFICE 2,390,069

CONTROL MECHANISM

Charles A. Arens, Chicago, Ill., assignor to Arens Controls, Inc., Chicago, Ill., a corporation of Illinois Application February 23, 1942, Serial No. 431,928

11 Claims. (Cl. 74—531)

This invention relates to control mechanisms having a shiftable control member, and concerns particularly locking means or means for imparting a predetermined resistance to movement of said member in its various positions of adjustment.

It is an object of the invention to provide a control mechanism of the type defined, of improved construction and improved operating characteristics.

More specifically stated, it is an object of the invention to provide in a control mechanism of the type having an adjustable control member shiftable between predetermined limits to effect the operation or control of an actuated device, improved means for locking or imparting a predetermined resistance to movement of said member in its various positions of adjustment.

Various objects, advantages and features of the invention will be apparent from the following specification when taken in connection with the accompanying drawings, wherein certain preferred embodiments of the invention are set forth for purposes of illustration.

In the drawings, wherein like reference numerals refer to like parts throughout:

Fig. 1 is a general assembly view, in perspective, of a control mechanism constructed in accordance with and embodying the principles of the invention;

Fig. 2 is a longitudinal vertical sectional view through the mechanism of Fig. 1, on the line 2—2 thereof, and showing the mechanism mounted upon a suitable supporting structure, the section line 2—2 being also shown in Fig. 3;

Fig. 3 is a transverse vertical sectional view through the mechanism, on the line 3—3 of Fig. 2;

Fig. 4 is a horizontal sectional view through the mechanism on the line 4—4 of Fig. 2;

Fig. 5 is a detail sectional view, on the line 5—5 of Fig. 2;

Fig. 6 is a view similar to Fig. 5, but showing the locking or resistance applying mechanism in operated position;

Figs. 7 and 8 are detail sectional views of the mechanisms of Figs. 5 and 6, on the lines 7—7 and 8—8, respectively;

Fig. 9 is a view similar to Fig. 2, but illustrating a modified form of structure;

Fig. 10 is a detail sectional view of the locking or resistance applying mechanism of the structure shown in Fig. 9, on the line 10—10 thereof;

Fig. 11 is a detail sectional view of the control handle for the locking or resistance mechanism of the structure of Fig. 9, on the line 11—11 thereof;

Fig. 12 is a detail sectional view through the mechanism of Fig. 11, on the line 12—12;

Fig. 13 is a view similar to Fig. 1, but showing a still further modified form of structure;

Fig. 14 is a longitudinal vertical sectional view through the structure of Fig. 13, on the line 14—14 thereof, the section line 14—14 being also shown in Fig. 15;

Fig. 15 is a transverse vertical sectional view through the mechanism of Fig. 14 on the line 15—15;

Fig. 16 is a detail sectional view of the locking or resistance applying mechanism of the structure shown in Fig. 14, on the line 16—16 thereof; and Fig. 17 is an exploded view of certain of the blocking or resistance applying mechanism, as embodied in the structure of Figs. 13–16.

This application is a continuation-in-part of my copending application, Serial No. 213,785, filed June 15, 1938, and entitled Control mechanism, now issued as Patent 2,274,288, dated February 24, 1942.

Referring more particularly to the drawings, and first to the embodiment of the invention illustrated in Figs. 1–8, it will be seen that the control mechanism comprises a frame consisting of two side plates or walls 10 and 11, Fig. 1, connected at their rear ends by a transverse wall or block member 12. The forward ends of the side walls are bent transversely toward each other as indicated at 13 and 14 to provide front flange structures, which flanges are adapted to be secured by means of bolts 15 and 16, Fig. 2, to a suitable support 17 which may be a vehicle dashboard or other suitable supporting structure. The side walls 10 and 11 are secured to the block 12 by suitable bolts such as indicated at 18 and 19, Figs. 1 and 4. A bolt 20 and a spacing sleeve 21, Fig. 4, are provided for securing the side walls together at their forward ends and for maintaining them in predetermined spaced relation.

A pair of control members 24 and 25 are mounted upon the frame, for pivotal movement with respect thereto, these members being in the form of control handles adapted for manual actuation. More specifically, the control members are pivotally mounted upon a bolt 26 extending between the side walls, suitable spacing sleeves being provided as indicated at 27, Fig. 3, for maintaining the control members 24 and 25 in predetermined spaced relation.

The control members 24 and 25 are in the form of bell-crank levers, and to that end are provided with upwardly extending portions 28 and 29, respectively, Figs. 2 and 3. Each of these upward extensions is adapted to be connected to a transmission mechanism extending to a suitable device to be controlled. By way of illustration, but not by way of limitation, such controlled device may comprise the carburetor of an internal combustion engine, or other suitable mechanism, the position of which is to be accurately controlled and adjusted by means of the positioning of the control levers or handles 24 and 25. More specifically, the extension 29 associated with the control member 25 is pivotally connected to a yoke 31 having an extension 32 suitably anchored to the end of a control wire 33, the opposite end of which is secured to the device to be controlled. Control wire 33 and its associated wire coil 34, to which the control wire is fixed, are slidable within a flexible sheath 35 preferably comprising a helically wound wire coil, or the like. The sheath 35 is anchored to the block 12, the sheath also extending through the block and being provided on its end with a sleeve 36 within which the projection 32 of the link 31 is longitudinally slidable. It will be seen that as the control member 25 is pivotally moved around the bolt or shaft 26, the extension 29 thereof will be shifted forwardly or rearwardly, causing a corresponding longitudinal movement of the link 31 the extension 32, and the transmission members 33 and 34, relative to the fixed sheath 35 and its associated guide fitting 36. The sheath coil 35 may, if desired, also be encased in a suitable fabric covering or the like 37.

Similar connections are provided whereby the upward extension 28 of the control lever 24 may operate a control wire assembly 40, 41, longitudinally movable within a sheath 42, and adapted to be suitably connected to a device to be controlled. The bolt 20 and associated spacing sleeve 21 act as a stop means for the levers 24 and 25 in their pivotal movements in a clockwise direction, as seen in Fig. 2.

In accordance with the principles of the invention, means is provided for applying predetermined resistance to movement of the control levers 24 and 25, in all of their adjusted positions, which means may, if desired, impart a substantially locking action to the levers, while at the same time being readily releasable to free the levers for instantaneous and ready operation.

In accordance with the form of structure illustrated in Figs. 1-8, this braking or resistance imparting means comprises a pair of braking rods 45 and 46 adapted to be secured, respectively, to the levers 24 and 25, and having associated therewith means for resisting movement of the rods in an adjustable predetermined amount. More specifically, referring to the control lever 25, the extension 29 thereof is provided with a series of openings 47 in any one of which the braking rod 46 is adapted to be pivotally mounted. To this end it will be seen that the rod is provided with a laterally turned end portion 48 pivotally engageable within a selected opening 47, and adapted to be secured therein by suitable means such as a cotter pin or the like 49, Fig. 3. Similar means is provided for connecting the braking rod 45 to the extension 28 of the lever 24.

Referring particularly to Figs. 2 and 5, it will be seen that the rear end of the braking rod 46 extends between a pair of friction blocks 51 and 52, and that the rod 45 similarly extends between a pair of friction blocks 53 and 54, all of the blocks being mounted upon a common bolt or shaft 55 extending between the frame side walls 10 and 11. One end of the bolt 55 is provided with a threaded nut 57, whereby to permit of adjustment of the parts for a purpose later to be described. In the particular embodiment illustrated the friction blocks 51—54 may be of metal, for cooperation with the metal shafts 45—46, but it is to be understood that the blocks may be constructed of any suitable material.

Washers 59 and 60 are interposed, respectively, between the block 51 and the side wall 10, and between the block 54 and the side wall 11. Spacing sleeves 61 and 62 are also mounted on the bolt 55, cone-springs 63 and 64 being provided between the spacing sleeves and the blocks 52 and 53. These cone-springs may be such that their convolutions may be collapsed into a common plane, as indicated in Fig. 6.

Energizing means is provided for causing the blocks 51—54 to frictionally grip the rods 45—46. As illustrated in Figs. 1-8, this energizing means comprises cam reactance devices relatively shiftable to force the spacing sleeves 61 and 62 apart whereby to cause the friction blocks to be brought into gripping engagement against the rods 45 and 46, as shown in Fig. 6. Referring to Fig. 2, a link 66 is mounted upon the bolt 26 at one end, the opposite end of the link being provided with a pair of openings into which balls 67 and 68, Figs. 5 and 6, are adapted to be inserted. A bifurcated lever 69, having bifurcations 70 and 71, is provided for cooperation with the balls 67 and 68, the bifurcations 70 and 71 being pivotally mounted upon the bolt 55. These bifurcations are provided with a series of cup-shaped depressions 72, the arrangement being such that when the parts are in the position illustrated in Figs. 5 and 7, the cup-shaped depressions and the balls are in nesting engagement, permitting the movement of the spacing sleeves 61 and 62, relatively toward each other, under the action of the springs 63 and 64.

When the bifurcated lever 69 is shifted from its position as shown in Figs. 5 and 7 to its position as shown in Figs. 6 and 8, the reactance devices comprising the balls 67—68 and the recesses 72 are brought out of alinement, resulting in an outward shifting movement of the sleeves 61 and 62, which in turn results in a gripping of the friction blocks against the rods 45 and 46.

The means for controlling the positioning of the lever 69 comprises a rod 75, the inner end of which is provided with a fitting 76 having a pin and slot connection with the lever 69. The outer end of rod 75 is provided with a manual control handle 77 by means of which the rod or shaft may be adjustably positioned, longitudinally, to effect the positioning of the lever 69. A sleeve 78 clamped to the support 17 by suitable means such as nuts 79 and 80 guides the rod 75 in its shifting movements. Engagement of the shank 81 of the handle against the nut 79 limits the inward movement of rod 75. The outward movement of the rod is limited by a stop 82 engageable with the sleeve 78.

In operation, with the parts in the position illustrated in Figs. 2, 5 and 7, the frictional drag imparted to the braking rods 45 and 46 by the friction blocks 51—54 is determined by the initial tension in the compression springs 63 and 64 under the conditions imparted by the particular adjustment of the nut 57 upon the bolt or shaft 55. This initial tension may be of any desired amount whereby to impart a light frictional resistance to movement of the rods 45 and 46, thereby imparting a light corresponding frictional resistance to movement of the control handles 24 and 25. Preferably the control handles at this time are substantially free to permit their ready manipulation and adjustment. As the handle 77 is pulled outwardly, the reactance devices 67—68 and 72 will be relatively shifted to the positions indicated in Figs. 6 and 8, causing an outward movement of the sleeves 61 and 62 and the application of increased frictional resistance of the blocks 51—54 against the brake rods 45 and 46. The arrangement of the parts may be such as to cause the springs 63 and 64 to merely be partially compressed, to apply increased frictional resistance or, as shown in Fig. 6, the arrangement may be such as to cause the springs to be completely compressed into a flat plane, a substantially positive abutment force being provided between the spacing sleeves 61—62 and the friction blocks. By this means a substantially positive locking action may be imparted to the braking rods. Adjustment of the nut 57 upon the bolt 55 will determine the degree of braking action obtained, the side walls 10 and 11 of the frame being sufficiently yieldable to permit of adjustment of the nut. The mechanical advantage of the brake rods with respect to the control levers 24 and 25 may also be further adjusted by inserting the forward ends of the rods in different openings 47 of the extensions 28 and 29, as may be desired. It will thus be seen that means is provided for readily locking or imparting a predetermined desired increase of frictional resistance to movement to the control levers 24 and 25 in any position of operation, by the operation of the control handle 77. As stated, such resistance to movement may be a substantially positive locking action, or a lesser frictional resistance, as may be desired, the degree of frictional locking resistance being readily and accurately controllable. Upon inward movement of the control handle 77, levers 24 and 25 are released for immediate and ready operation. Both control levers are simultaneously locked or unlocked by manipulation of the single handle 77, the structure thus being well adapted for dual control installations. The levers 24 and 25, being in immediate juxtaposition, may be conjointly operated, while at the same time being susceptible to such relative movement, one to the other, as may be required to permit accurate control and adjustment of the controlled devices.

In Figs. 9-12 a modified form of structure is illustrated, generally similar to that previously described, but modified in certain particulars. A different form of cam action reactance device is employed, also a different form of friction gripping mechanism for the brake rods; and locking means is provided in association with the braking mechanism control handle, for locking or maintaining the handle in any position of adjustment.

Referring to Figs. 9 and 10, it will be seen that in this instance the bolt or shaft 55a has mounted thereon a pair of split clamps 90 and 91 embracing the braking rods 45a and 46a, respectively. Compression springs 92 and 93 are disposed between the ends of these clamp members, tending to open them toward non-gripping position. Spacing washers 94 and 95 are disposed between the clamps and the frame or casing walls 11a and 10a, in a manner similar to the washers 59 and 60 of the embodiment of the invention previously described.

A pair of reactance devices 96 and 97 are provided for urging the clamps 90 and 91 into frictional gripping engagement with the rods. The reactance device 96 is in the form of an externally threaded sleeve loosely mounted on the shaft 55a, whereas the reactance device 97 is in the form of a sleeve loosely mounted on the shaft but internally threaded, the two sleeves being in co-operating cam threaded engagement. Sleeve 96 is anchored to the casing 11a, against rotation, by means of a bracing strut 98. Sleeve 97 is provided with a depending lever projection 99 having a pin and slot connection with the fitting 76a of the locking control structure, in a manner similar to the pin and slot connection between the lever 69 and the fitting 76 in the previously described embodiment of the invention.

The arrangement is such that when the lever 99 is in the position illustrated in Fig. 9, a predetermined minimum pressure engagement is provided between the clamps 90 and 91 and the rods 45a and 46a, depending upon the adjustment of the bolt 57a. When the lever 99 is swung clockwise, by pulling on handle 77a, the reactance sleeves 96 and 97 are relatively separated by reason of their threaded engagement, sleeve 96 being prevented from rotation as the sleeve 97 is rotated with the lever 99. The bracing strut 98 and the lever 99 are sufficiently flexible to permit of the slight longitudinal shifting of the sleeves 96 and 97, axially of the bolt 55a. As the sleeves are shifted away from each other, the clamps 90 and 91 are actuated to impart increased frictional locking resistance against the shafts 45a and 46a. Springs 92 and 93 tend to maintain the clamps toward open position, in engagement with collars 94—95 and sleeves 96—97.

It will be seen that the operation is substantially similar to that in the previously described structure. However, in the case of the screw threaded sleeves or micrometer adjustment means of the structure of Figs. 9 and 10, a continuously increasing frictional pressure is applied as the lever 99 is shifted.

Means is also provided for locking the lever 99 in any position of adjustment, such means being best shown in Figs. 9, 11 and 12. As illustrated, in this instance the handle 77a is connected by means of its shank 101 and a pin 102 to a sleeve 103, on the opposite end of which is secured the fitting 76a, the sleeve 103 thus being generally similar in function and purpose to the rod or shaft 75 of the embodiment of the invention previously described. A fixed guide sleeve 104 is secured to the dashboard 17a by means of nuts 105 and 106, the operating sleeve 103 being shiftable longitudinally within the guide sleeve 104 as the handle 77a is pushed or pulled. A locking and release shaft 107 is disposed internally of the sleeve 103, for longitudinal shifting movement, the shaft being provided with an operating button 108 on one end and a notch 109 on its opposite end. This notch is adapted for cooperation with a ball 110 arranged within an opening 111 formed in the operating sleeve 103. A compression spring 112 embracing the shaft 107, normally urges said shaft to the left with respect to the sleeve 103, thereby causing the notch 109 to urge the ball 110 against the fixed guide sleeve 104. The reaction of the ball against the notch 109 causes the shaft 107 to urge the sleeves 103 and 104 into frictional gripping engagement, whereby to lock the sleeve 103 in adjusted position. Movement of the operating button 108 inwardly toward the handle 77a releases the locking action, whereupon the handle 77a may be shifted to bring the sleeve 103 and associated connected lever 99 to any desired adjusted position.

The locking mechanism of Fig. 11 thus provides means for insuring the maintenance of the reactance devices 96 and 97 accurately in any adjusted position.

In Figs. 13-17 a further modified embodiment of the invention is illustrated. In this instance a pair of control levers 120 and 121 are provided, of somewhat different shape than the levers 24 and 25 of the embodiment previously described, but for the same function and purpose. Levers 120 and 121 are pivotally mounted upon a sleeve 122 carried by a bolt 123 extending between the side walls 125 and 126 of the casing structure for the mechanism. The bolt 123 is provided on its end with an adjustment nut 124, and it will be noted that the sleeve 122 terminates somewhat short of the casing side walls to permit of adjustment of the nut. The levers 120 and 121 are provided with upward extensions 127 and 128, respectively, adapted to be connected to transmission cables extending to the controlled devices, in a manner previous to that described in connection with Figs. 1-8. Anchor brackets, such as indicated at 130 in Fig. 14, are provided as an anchorage for the end of the cable sheaths, for the function and purpose of the block 12 of the structure of Fig. 1.

As in the case of the earlier described embodiments, means is provided, operable at will, for imparting a controlled degree of frictional resistance to movement of the control levers 120 and 121, in all positions of adjustment. As best illustrated in Figs. 15, 16 and 17, a plurality of cylindrical blocks 132, 133, 134 and 135 are loosely mounted upon the sleeve 122, for maintaining the control levers and the reactance devices, later to be described, in proper spaced relation. These blocks may be of metal or of other suitable material such as plastics or the like. A pair of friction discs 136 and 137, also mounted on the sleeve 122, are arranged on opposite sides of the control lever 121, in contacting relation therewith, similar friction discs 138 and 139 being provided for the control lever 120. As best shown in Fig. 17, these friction discs are provided with bifurcations 140 adapted to engage a positioning bolt 141 extending between the side walls of the casing, in juxtaposition to the bolt 123. Bolt 141 is provided with a head 142 and a nut 143. The bifurcations 140 on the friction discs prevent the discs from rotation on the sleeve 122. The friction discs are preferably constructed of friction material, such as commonly employed in brake linings and the like.

A pair of reactance devices 145 and 146 are provided, relatively shiftable to impart a predetermined resistance to movement of the levers 120 and 121. Reactance device 145 is in the form of a disc mounted on sleeve 122 and having furcations 147 adapted to embrace the bolt 141, whereby to prevent rotation of the disc. Reactance device 146 is similarly provided in the form of a disc mounted on the sleeve 122 and having a projecting lever or handle portion 148 connected thereto. This handle portion is adapted to extend through a slot 149 formed in the front wall 150 of the housing. A plurality of cam detents 151, three in the particular embodiment illustrated, are struck from the body of the disc 145, cooperating cam detents 152 being struck from the body of the disc 146. As best shown in Fig. 16, the detents 151 of the disc 145 project toward the disc 146, and similarly the detents 152 of the disc 146 project toward the disc 145.

All of the detents are preferably similarly shaped and are provided with cam or inclined portions 153 and flat top portions 154.

With the control handle 148 in the position shown in Figs. 13, 15 and 16, and in solid lines in Fig. 14, the sets of detents 151 and 152 are circumferentially displaced and out of contact, so that a predetermined minimum of frictional resistance is imparted by the washers 136—139 against the control levers 120 and 121, depending upon the adjustment of the nut 124. When the handle 148 is raised to the dotted line position of Fig. 14, the detents 152 are brought into superposed relation, respectively, with the detents 151, thereby applying an increased frictional resistance of the friction discs against the control levers, the magnitude of which is dependent upon the construction and proportioning of the parts, and may be anything from a positive locking action down to a lesser degree of frictional locking resistance. Due to the flat top surfaces of the detents, there is no tendency for the control handle 148 to inadvertently shift toward unlocking position. If desired, however, a slightly reverse inclination may be imparted to the top surfaces of the detents, or a notch or the like may be added to the slot 149 within which the lever is movable, whereby to provide a locking action to the lever 148 against inadvertent reverse movement. In this connection it is to be noted that the lever 148 tends to move slightly sidewise with respect to the slot 149, as it is raised or shifted to locking position. The range of travel of the control levers 120 and 121 is indicated by the full and dotted lines in Fig. 14, and it will be noted that the bolt 141 limits the shifting of the levers in a clockwise direction.

Various changes may be made in the specific embodiments set forth for purposes of illustration without departing from the spirit of the invention. The invention accordingly is not to be limited to the specific embodiments shown and described, but only as indicated in the following claims.

The invention is hereby claimed as follows:

1. A control mechanism comprising a pivotally mounted control lever, said lever being manually shiftable and limited for movement through an arc of travel of less than 360 degrees and adapted to be connected to a device to be controlled, and means for controlling resistance to movement of said lever comprising friction brake means operatively connected to the lever, a pair of complementary cam reactance devices relatively shiftable for energizing said brake means, a manually operable control handle for relatively shifting said reactance devices, a frame structure having a pair of laterally spaced side plates embracing the control mechanism, and screw threaded means engageable with opposite faces of said plates for predetermining the effectiveness of said cam reactance devices.

2. A control mechanism comprising a frame having a pair of side walls, a shaft mounted in said side walls, a control handle member pivotally mounted on said shaft, said member being limited for movement through an arc of travel of less than 360 degrees and adapted to be connected to a device to be controlled, and means for controlling resistance to movement of said member comprising braking means operatively connected to the member, a pair of complementary reactance devices relatively shiftable for imparting maximum and minimum effectiveness to said braking means, means comprising a second handle member for relatively shifting said reactance devices, and means cooperably engageable with said side walls for predetermining the effectiveness of said reactance devices.

3. A control mechanism as defined in claim 2, wherein said cam reactance devices comprise a ball member and a cam member with which the ball member is adapted to be engaged.

4. A control mechanism as defined in claim 2, wherein said cam reactance devices comprise a plurality of engageable detents, said detents having cam surfaces adapted to be initially engaged as the detents are brought into contact, and holding surfaces adapted to be thereafter brought into engagement whereby to render said second named handle member self-holding in operated position.

5. A control mechanism comprising a frame having a pair of side walls, a shaft mounted in said side walls, a control handle member pivotally mounted on said shaft, said member being limited for movement through an arc of less than 360 degrees and adapted to be connected to a device to be controlled, and braking means for controlling resistance to movement of said member, said braking means comprising a pair of complementary engageable cam reactance devices mounted on said shaft and relatively rotatable thereon, said cam devices being axially shiftable upon relative rotation, between relatively operative and inoperative positions, means comprising a manual control handle for rotating one of said cam reactance devices, means radially displaced from said shaft for anchoring the other reactance device from rotation, and clamping means associated with said shaft for predetermining the initial axial position of said cam reactance devices.

6. A control mechanism comprising a control member, said member being shiftable through a predetermined range of travel and adapted to be connected to a device to be controlled, and means for controlling resistance to movement of said member comprising braking means operatively connected to the member, a pair of complementary reactance devices relatively shiftable for energizing said braking means, a manually operable control handle shiftable through a predetermined range of travel for relatively shifting said reactance devices, and automatically operable resiliently urged means for locking said control handle at any position within said range of travel.

7. A control mechanism comprising a pair of control levers, a common shaft upon which said control levers are pivotally mounted, said levers being independently shiftable through a predetermined range of travel and adapted to be connected to devices to be controlled, braking means for controlling resistance to movement of said levers between predetermined maximum and minimum limits, means for predetermining said limits, and a manually operable control handle for shifting said braking means between said limits.

8. A control mechanism as defined in claim 5, wherein the means radially displaced from the shaft for anchoring the other reactance device comprises a shaft mounted between the frame side walls, and wherein said other reactance device is provided with a bifurcated portion embracing said last mentioned shaft.

9. A control mechanism as defined in claim 5, wherein the means radially displaced from the shaft for anchoring the other reactance device comprises a shaft mounted between the frame side walls, wherein said other reactance device is provided with a bifurcated portion embracing said other last mentioned shaft, and wherein the cam reactance devices include a plurality of engageable detents having cam surfaces adapted to be initially engaged as the detents are brought into contact, and holding surfaces adapted to be thereafter brought into engagement to render the detents self-holding in operated position.

10. A control mechanism as defined in claim 5, wherein the means radially displaced from the shaft for anchoring the other reactance device comprises a shaft mounted between the frame side walls, wherein said other reactance device is provided with a portion engaging said last mentioned shaft, and wherein the device to be controlled comprises an elongated cable shiftable within a sheath structure, which sheath structure is secured to the control mechanism frame.

11. A control mechanism comprising a frame having a pair of side walls, an elongated bolt mounted between and extending through said side walls, a sleeve member mounted on the bolt between the side walls, a control handle member pivotally mounted on said sleeve, said member being limited for movement through an arc of travel of less than 360° and adapted to be connected to a device to be controlled, and means for controlling resistance to movement of said member comprising braking means operatively connected to the member, a pair of complementary reactance devices relatively shiftable for imparting maximum and minimum effectiveness to said braking means, means comprising a second handle member mounted on said sleeve and limited for movement through an arc of travel of less than 360° for relatively shifting said reactance devices, and means comprising a nut threadedly engageable with one end of said bolt for predetermining the effectiveness of said reactance devices.

CHARLES A. ARENS.